United States Patent
Daubert et al.

(10) Patent No.: US 8,753,513 B2
(45) Date of Patent: Jun. 17, 2014

(54) AMMONIA-PEROXIDE WASTEWATER TREATMENT SYSTEM

(75) Inventors: Linda N. Daubert, Beacon, NY (US); Randall P. Duggan, Mohegan Lake, NY (US); James M. MacDougall, Beacon, NY (US); James G. Sales, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 872 days.

(21) Appl. No.: 12/942,358

(22) Filed: Nov. 9, 2010

(65) Prior Publication Data

US 2012/0111793 A1 May 10, 2012

(51) Int. Cl.
 C02F 9/02 (2006.01)
 C02F 9/04 (2006.01)
 C02F 1/04 (2006.01)
 C02F 1/66 (2006.01)

(52) U.S. Cl.
 USPC ........... 210/632; 210/763; 210/205; 210/259; 203/29; 203/31

(58) Field of Classification Search
 USPC ......... 210/632, 749, 757, 759, 763, 766, 774, 210/205, 252, 258, 259; 203/28, 29, 31
 See application file for complete search history.

(56) References Cited

U.S. PATENT DOCUMENTS

| 3,980,757 A | 9/1976 | Dokuzoguz |
| 5,421,998 A | 6/1995 | Li et al. |
| 5,454,950 A | 10/1995 | Li et al. |
| 5,486,467 A | 1/1996 | Fusho et al. |
| 5,582,715 A | 12/1996 | McBrayer, Jr. et al. |
| 6,007,727 A * | 12/1999 | Bohrer et al. .................. 210/759 |
| 6,582,605 B2 | 6/2003 | Krulik et al. |
| 6,652,758 B2 | 11/2003 | Krulik |
| 6,660,059 B2 | 12/2003 | Ji et al. |
| 6,969,466 B1 | 11/2005 | Starner |
| 7,066,983 B2 | 6/2006 | Ji et al. |
| 7,127,913 B2 | 10/2006 | Witkamp et al. |
| 7,250,481 B2 | 7/2007 | Jaworek et al. |
| 7,544,232 B2 | 6/2009 | Hackl et al. |
| 7,559,974 B2 | 7/2009 | Ji et al. |
| 7,704,298 B2 | 4/2010 | Ji et al. |
| 7,722,840 B2 | 5/2010 | Hackl et al. |

FOREIGN PATENT DOCUMENTS

| JP | 11290870 A * | 10/1999 |
| WO | 9317721 A1 | 9/1993 |

OTHER PUBLICATIONS

English translation of JP 11-290970 to Okochi, 1999 (obtained from JPO Oct. 2013).*

* cited by examiner

Primary Examiner — Lucas Stelling
(74) Attorney, Agent, or Firm — Cantor Colburn LLP; Ian MacKinnon

(57) ABSTRACT

A method of treating wastewater containing peroxide and ammonia includes performing a first stage peroxide pretreatment of the wastewater with a catalyst, and performing a second stage ammonia separation of the peroxide treated wastewater by a distillation process, thereby producing a concentrated ammonium hydroxide end product that is separated from the wastewater.

24 Claims, 2 Drawing Sheets

AMMONIA-PEROXIDE WASTEWATER TREATMENT SYSTEM

BACKGROUND

The present invention relates generally to semiconductor device manufacturing processes and, more particularly, to an ammonia-peroxide wastewater treatment system for treating wastewater produced in semiconductor device manufacturing.

In addition to environmental pollution, industrial water consumption is being closely monitored by regulatory agencies that are demanding water consumption be reduced and that discharged wastewater have low levels of solids and contaminants. The semiconductor manufacturing industry not only consumes an ever-increasing amount of water but, as a consequence, also ends up discharging large volumes of wastewater. For example, a chemical mechanical polishing (CMP) involves a polishing slurry composed of an oxidant such as hydrogen peroxide ($H_2O_2$), an abrasive, complexing agents, and other additives. The polishing slurry is used with a polishing pad to remove excess copper from a wafer. Ammonia ($NH_3$) is another process chemical that is used in semiconductor device manufacturing. Ammonia may be used, for example, in the deposition of silicon nitride and other nitride materials. Further, ammonia combined with aqueous hydrogen peroxide is used in various semiconductor cleaning operations.

One existing process for removing high concentrations of peroxide and ammonia from semiconductor wastewater involves chemically treating the peroxide on an industrial scale, optionally followed by nitrification and denitrification of the ammonia through biological treatment processes. Specifically, peroxide laden wastewater is chemically treated by adding large quantities of sodium bisulfite ($NaHSO_3$), used as a reducing agent, and large quantities of sodium hydroxide (NaOH), a caustic used to neutralize the acidity of the sodium bisulfite. More specifically, in a first stage chemical reduction:

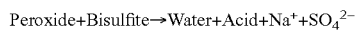

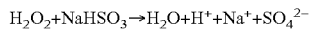

Then, to Neutralize the Resulting Acid:

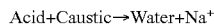

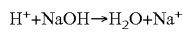

However, such a process, among other disadvantages, is labor intensive in nature, incorporate the uses of large quantities of expensive and hazardous chemicals, and results in concentrated salts (e.g., sodium, sulfate) being present in the waste stream, which is a significant contributor to total dissolved solids (TDS) and toxicity.

SUMMARY

In one aspect, a method of treating wastewater containing peroxide and ammonia includes performing a first stage peroxide pretreatment of the wastewater with a catalyst; and performing a second stage ammonia separation of the peroxide treated wastewater by a distillation process, thereby producing a concentrated ammonium hydroxide end product that is separated from the wastewater.

In another aspect, a method of treating semiconductor manufacturing wastewater containing peroxide and ammonia includes performing a first stage peroxide pretreatment of the wastewater by mixing a liquid enzyme catalyst and a first pH modifier with the wastewater, the first pH modifier selected to maintain the wastewater at a first pH range that prevents liberation of ammonia gas; and performing a second stage ammonia separation of peroxide treated, ammonium hydroxide containing wastewater from the first stage by adding a second pH modifier to raise the pH of the waste water to a second pH range, and performing a distillation process, thereby producing a concentrated ammonium hydroxide end product that is separated from the wastewater.

In another aspect, a system for treating semiconductor manufacturing wastewater containing peroxide and ammonia includes a peroxide pretreatment stage including a first mix tank that receives the wastewater as an input thereto, the first mix tank configured to mix the wastewater with a liquid enzyme catalyst and a first pH modifier, the first pH modifier selected to maintain the wastewater at a first pH range that prevents liberation of ammonia gas in the peroxide pretreatment stage; and an ammonia separation stage, including one or more feed tanks that receives peroxide treated, ammonium hydroxide containing wastewater from the first stage, the ammonia separation system configured to add a second pH modifier to raise the pH of the waste water to a second pH range, and a distillation system configured to produce a concentrated ammonium hydroxide end product that is separated from the wastewater.

BRIEF DESCRIPTION OF THE SEVERAL VIEWS OF THE DRAWINGS

Referring to the exemplary drawings wherein like elements are numbered alike in the several Figures.

DETAILED DESCRIPTION

Disclosed herein is a method and system for treating ammonia-peroxide laden wastewater produced in semiconductor manufacturing. In exemplary embodiments, the method generally implements a first stage catalytic hydrogen peroxide pretreatment that removes peroxide using a very small volume of liquid enzyme, and in so doing avoids the use of sodium bisulfite and sodium hydroxide for peroxide pretreatment. Further, a second stage distillation treatment recovers concentrated ammonium hydroxide from the reduced wastewater as an end product that may be used off site, for example, within a catalytic $NO_x$ incineration process.

Included among the several advantages of the presently disclosed treatment system and method embodiments are, for example: the elimination of concentrated salts (total dissolved solids) generated in the treatment process, significantly lower chemical costs from the elimination of sodium bisulfite and sodium hydroxide, reduced tanker truck shipments owing to the elimination of peroxide treating chemicals, and the reduced use of larger quantities of such hazardous chemicals. Moreover, there is no need for additional infrastructure (beyond the existing infrastructure for peroxide pretreatment and ammonia separation) to further convert the ammonia product to a form to allow for offsite disposal as a waste product.

Figure 1:
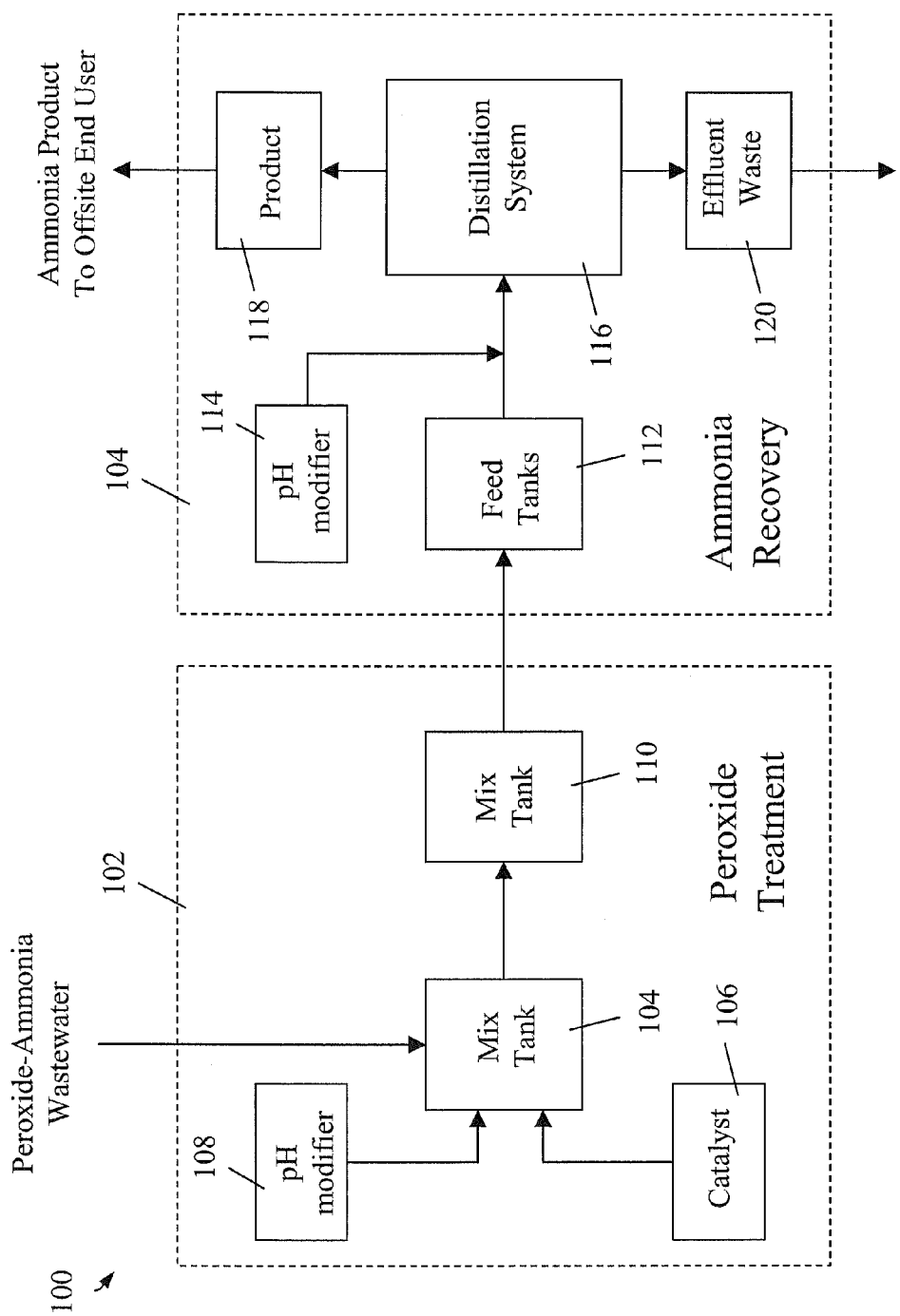
FIG. 1 is a schematic block diagram of a system for treating ammonia-peroxide laden wastewater produced in semiconductor manufacturing, in accordance with an exemplary embodiment of the invention.

Referring to FIG. 1, there is shown a schematic block diagram of a system 100 for treating ammonia-peroxide laden wastewater produced in semiconductor manufacturing, in accordance with an exemplary embodiment of the invention. As is shown, the system 100 generally includes a first stage 102 for peroxide pretreatment, and a second stage 103 for ammonia separation and recovery following the peroxide pretreatment.

The ammonia-peroxide laden wastewater is introduced into a first mix tank 104, which also receives a catalyst 106 and a pH modifier 108 for reducing the pH of the ammonia-peroxide wastewater. In order to maintain the ammonia gas in a dissolved state in the wastewater during the reduction of the hydrogen peroxide, the pH modifier 108 maintains the pH of the wastewater in the first mix tank 106 within a range of about 2.5 to about 4.0. In one embodiment, a relatively small amount of sulfuric acid ($H_2SO_4$) (e.g., about five gallons per day as compared to a total treated volume of about 80,000 gallons per day) may be used to maintain the desired pH range. The catalyst 106, therefore, is selected so as to be active in such an acidic pH range. In an exemplary embodiment, the catalyst 106 is Optimase® CA 400L, an enzyme commercially available from Genencor International, a Danisco company.

The wastewater from the first mix tank 104 is fed to a second mix tank 110 to complete the peroxide pretreatment process of converting hydrogen peroxide to water and oxygen, and de-entraining the oxygen from the wastewater. The reduced wastewater is then fed to one or more feed tanks 112 in the ammonia separation recovery stage 103. Here, the pH of the ammonium hydroxide wastewater is raised to a level within a range of about 12 to about 14 with a pH modifier 114, such as sodium hydroxide (NaOH) for example.

Also included within the second stage 103 for ammonia separation and recovery is a distillation system 116. Once the pH of the ammonium hydroxide introduced in the feed tank(s) 112 is raised, heat is applied so as to separate the ammonia gas from the wastewater. The separated ammonia gas is then condensed and recaptured as an ammonium hydroxide product 118 that may be sent offsite for reuse (as opposed to disposal in conventional systems). Although not quite at a semiconductor grade concentration, the end product ammonium hydroxide may have a solution concentration of about 25% by weight. Finally, the remaining effluent wastewater 120, having been treated for peroxide and ammonia removal may be further treated on site or discharged.

Figure 2:
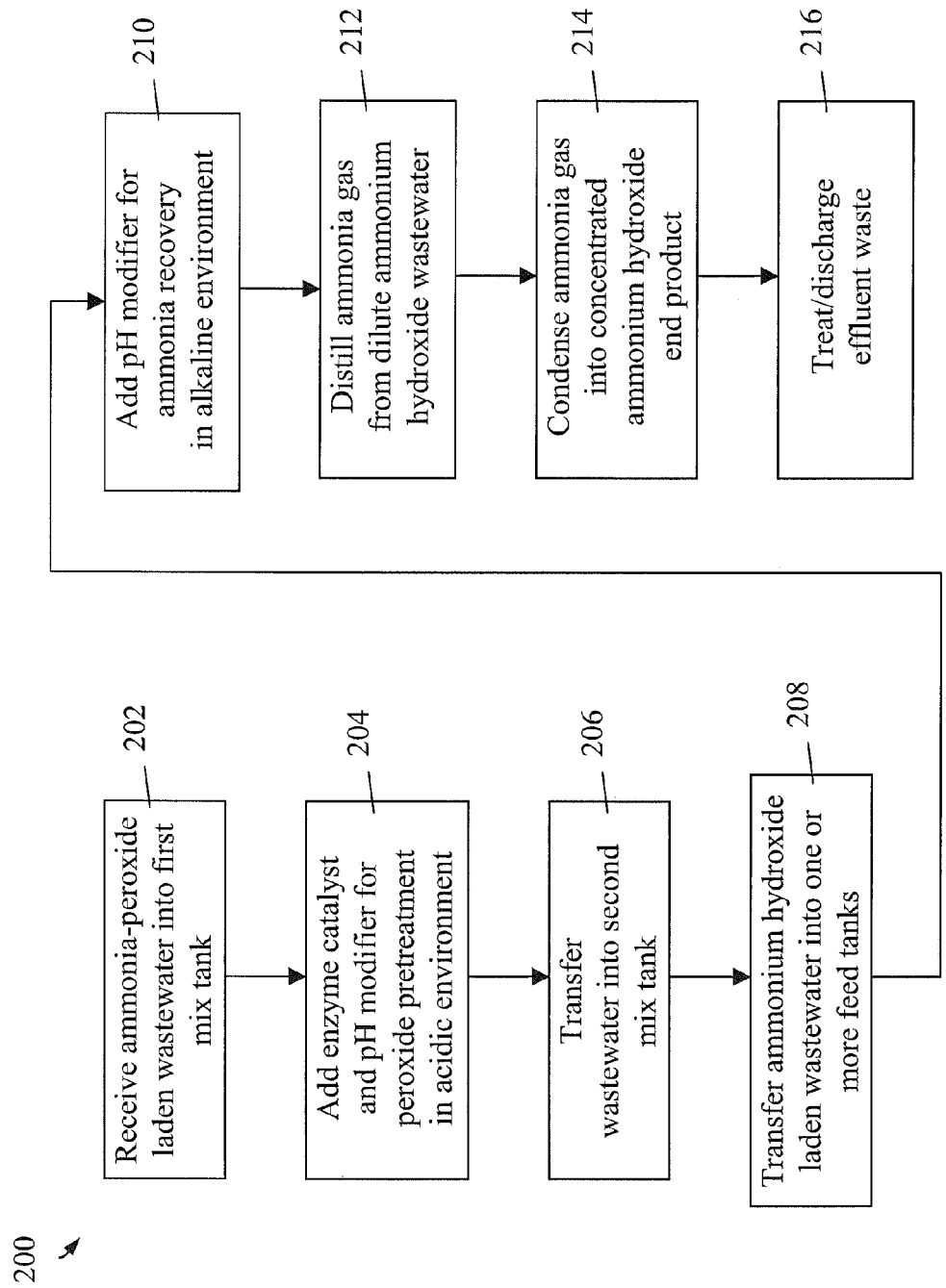
FIG. 2 is a flow diagram illustrating an exemplary method for treating ammonia-peroxide laden wastewater produced in semiconductor manufacturing, accordance with an exemplary embodiment of the invention.

FIG. 2 is a flow diagram 200 illustrating an exemplary method for treating ammonia-peroxide laden wastewater produced in semiconductor manufacturing, such as with system 100 of FIG. 1, in accordance with an exemplary embodiment of the invention. As shown in block 202, the method begins by receiving ammonia-peroxide laden wastewater into a first mix tank, such as mix tank 104. The concentration of the ammonia-peroxide wastewater may be on the order about 4000 milligrams per liter (mg/L). The first mix tank 104 may have a capacity of, for example, about 10,000 gallons. Then, in block 204, a peroxide pretreatment is implemented by adding an enzyme catalyst to the first mix tank. Again, the enzyme catalyst is one that has substantially maximum catalyst activity at a pH in the range of about 2.5 to about 4.0. In contrast to the large volume of peroxide reducing chemicals, about 0.7 gallons per day of enzyme may be used to treat about 80,000 gallons per day of wastewater. As further indicated above, a pH modifier such as $H_2SO_4$ is also added to the first mix tank to maintain the acidic environment.

In block 206, the wastewater is transferred into a second mix tank, such as mix tank 110, in series with the first mix tank. The second mix tank 110 may also have a capacity of about 10,000 gallons. In one embodiment, both mix tanks operate at a flow rate of about 60 gallons per minute, where the first mix tank has a reaction time of about 170 minutes and the second mix tank has a reaction time of about 130 minutes, for a total reaction time of about 300 minutes.

Proceeding to block 208, the reduced wastewater is transferred to one or more feed tanks for ammonia recovery. At this point, the dilute ammonium hydroxide in the wastewater may have a concentration of about 0.15% by weight. Then, as shown in block 210, a pH modifier (e.g., NaOH) is added to the wastewater so as to raise the pH thereof within a range of about 12 to about 14. In block 212, heat is added in accordance with a distillation process that separates ammonia gas from the wastewater. The separated ammonia gas is then condensed back into a concentrated ammonium hydroxide solution, as shown in block 214. Through such a process, the concentration of the ammonium hydroxide may be brought up to about 25% by weight. Finally, as shown in block 216, the peroxide and ammonia treated wastewater may be transferred for further treatment or discharge as effluent waste.

As will thus be appreciated, the above described embodiments provide an improved method of treating peroxide-ammonia laden waste water in a manner that not only eliminates the use of costly, voluminous and hazardous chemicals, but also eliminates a source of TDS, and recovers a useful ammonium hydroxide end product. With respect to cost, it is estimated that the catalytic pretreatment/ammonia recovery process is about 13% of that for conventional chemical treatment.

While the invention has been described with reference to a preferred embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method of treating wastewater containing peroxide and ammonia, the method comprising:
    performing a first stage peroxide pretreatment of the wastewater with a catalyst;
    performing a second stage ammonia separation of the peroxide treated wastewater by a distillation process, thereby producing a concentrated ammonium hydroxide end product that is separated from the wastewater; and
    adding a pH modifier to the wastewater in the second stage ammonia separation, following the first stage peroxide pretreatment, to raise the pH of the wastewater in a range from about 12 to about 14.

2. The method of claim 1, wherein the catalyst comprises a liquid enzyme.

3. The method of claim 2, wherein the liquid enzyme comprises a catalase.

4. The method of claim 3, wherein the catalase is active within a pH range from about 2.5 to about 4.0.

5. The method of claim 1, wherein the first stage pretreatment is performed within a pH range so as prevent liberation of ammonia gas from wastewater prior to the second stage ammonia separation.

6. The method of claim 1, wherein the concentrated ammonium hydroxide end product has a concentration of about 25% by weight.

7. A method of treating wastewater containing peroxide and ammonia, the method comprising:
performing a first stage peroxide pretreatment of the wastewater with a catalyst; and
performing a second stage ammonia separation of the peroxide treated wastewater by a distillation process, thereby producing a concentrated ammonium hydroxide end product that is separated from the wastewater;
wherein the first stage pretreatment is performed within a pH range from about 2.5 to about 4.0 so as prevent liberation of ammonia gas from wastewater prior to the second stage ammonia separation.

8. The method of claim 7, further comprising adding a pH modifier to the wastewater to maintain the pH range from about 2.5 to about 4.0.

9. The method of claim 8, wherein the pH modifier comprises sulfuric acid ($H_2SO_4$).

10. A method of treating semiconductor manufacturing wastewater containing peroxide and ammonia, the method comprising:
performing a first stage peroxide pretreatment of the wastewater by mixing a liquid enzyme catalyst and a first pH modifier with the wastewater, the first pH modifier selected to maintain the wastewater at a first pH range that prevents liberation of ammonia gas; and
performing a second stage ammonia separation of peroxide treated, ammonium hydroxide containing wastewater from the first stage by adding a second pH modifier to raise the pH of the waste water to a second pH range, and performing a distillation process, thereby producing a concentrated ammonium hydroxide end product that is separated from the wastewater.

11. The method of claim 10, wherein the first pH range is from about 2.5 to about 4.0.

12. The method of claim 11, wherein the first pH modifier comprises sulfuric acid ($H_2SO_4$).

13. The method of claim 10, wherein the second pH range is from about 12 to about 14.

14. The method of claim 13, wherein the second pH modifier comprises sodium hydroxide (NaOH).

15. The method of claim 10, wherein the concentrated ammonium hydroxide end product has a concentration of about 25% by weight.

16. The method of claim 10, wherein the liquid enzyme catalyst and first pH modifier are mixed with the wastewater in a first mix tank, with the contents of the first mix tank transferred to a second mix tank in series with the first mix tank.

17. The method of claim 16, wherein the contents of the first mix tank have a reaction time of about 170 minutes, and the contents of the second mix tank have a reaction time of about 130 minutes.

18. A system for treating semiconductor manufacturing wastewater containing peroxide and ammonia, comprising:
a peroxide pretreatment stage including a first mix tank that receives the wastewater as an input thereto, the first mix tank configured to mix the wastewater with a liquid enzyme catalyst and a first pH modifier, the first pH modifier selected to maintain the wastewater at a first pH range that prevents liberation of ammonia gas in the peroxide pretreatment stage; and
an ammonia separation stage, including one or more feed tanks that receives peroxide treated, ammonium hydroxide containing wastewater from the first stage, the ammonia separation system configured to add a second pH modifier to raise the pH of the waste water to a second pH range, and a distillation system configured to produce a concentrated ammonium hydroxide end product that is separated from the wastewater.

19. The system of claim 18, wherein the first pH range is from about 2.5 to about 4.0.

20. The system of claim 19, wherein the first pH modifier comprises sulfuric acid ($H_2SO_4$).

21. The system of claim 18, wherein the second pH range is from about 12 to about 14.

22. The system of claim 21, wherein the second pH modifier comprises sodium hydroxide (NaOH).

23. The system of claim 18, wherein the concentrated ammonium hydroxide end product has a concentration of about 25% by weight.

24. The system of claim 18, wherein the peroxide pretreatment stage further comprises a second mix tank in series with the first mix tank.

* * * * *